(12) United States Patent
Braun

(10) Patent No.: US 6,169,042 B1
(45) Date of Patent: Jan. 2, 2001

(54) PLASTERING FILLET WITH ATTACHED REINFORCING MATERIAL

(76) Inventor: August Braun, Quellenstrasse 24, CH-8200 Schaffhausen (CH)

( * ) Notice: Under 35 U.S.C. 154(b), the term of this patent shall be extended for 0 days.

(21) Appl. No.: 09/067,979

(22) Filed: Apr. 29, 1998

(30) Foreign Application Priority Data

Apr. 30, 1997 (DE) .............................................. 197 18 450
Jan. 27, 1998 (DE) ............................................. 198 03 034

(51) Int. Cl.[7] .......................... B32B 13/02; E04D 13/12; E04B 2/00
(52) U.S. Cl. ................................ 442/42; 442/20; 442/27; 428/102; 428/103; 52/5; 52/42; 52/417; 52/454
(58) Field of Search .................................. 442/42, 20, 27; 52/5, 42, 43, 44, 222, 236.8, 236.9, 272, 282.5, 306, 454, 309.6, 309.7, 98, 403.1, 473, 417; 428/102, 103

(56) References Cited

U.S. PATENT DOCUMENTS

| | | | |
|---|---|---|---|
| 3,765,138 | * 10/1973 | Bentle | 52/255 |
| 3,887,748 | * 6/1975 | Swedenberg et al. | 442/42 |
| 4,021,258 | * 5/1977 | Uogaeshi | 442/42 |
| 4,284,447 | * 8/1981 | Dickens et al. | 156/78 |
| 4,378,401 | * 3/1983 | Wright | 56/62.2 |
| 4,672,787 | * 6/1987 | Murphy | 52/409 |
| 4,763,397 | 8/1988 | Tsukayama et al. | |
| 4,910,076 | * 3/1990 | Ando et al. | 442/20 |
| 4,912,899 | * 4/1990 | Plasker et al. | 52/241 |
| 5,127,204 | * 7/1992 | Braun | 52/417 |
| 5,437,823 | * 8/1995 | Hettinga et al. | 264/45.5 |
| 5,791,109 | * 8/1998 | Lehnert et al. | 52/309.17 |
| 5,978,979 | * 11/1999 | Baker | 4/510 |
| 5,981,050 | * 11/1999 | Kaempen et al. | 428/294.7 |

FOREIGN PATENT DOCUMENTS

| | | |
|---|---|---|
| 3739912 | 6/1989 | (DE) . |
| WO97/04197 | 2/1997 | (DE) . |

* cited by examiner

Primary Examiner—Terrel Morris
Assistant Examiner—Arti R. Singh
(74) Attorney, Agent, or Firm—Venable; George Spencer; Robert Kinberg

(57) ABSTRACT

A plastering layer (2) of plastics material, having attached thereto a net reinforcing material (6) to be embedded in or underneath a plaster layer (12), in particular a plaster layer (12) on a thermal insulation (16) of a building wall (26), wherein said reinforcing material (6) is connected to said plastering fillet (2) by means of at least one plastics strand (8), with said reinforcing material (6) having been interposed between plastering fillet (2) and plastics strand (8) when the connection was made, and with a material-uniting connection being established between plastering fillet (2) and plastics strand (8).

27 Claims, 2 Drawing Sheets

PLASTERING FILLET WITH ATTACHED REINFORCING MATERIAL

FIELD OF THE INVENTION

The invention relates to a plastering fillet of plastics material, having attached thereto a net reinforcing material to be embedded in or underneath a plaster layer, in particular a plaster layer on the thermal insulation of a building wall.

BACKGROUND OF THE INVENTION

Such plastering fillets are known. For attaching net reinforcing material thereto, either adhering to or providing a type of clamping connection between the basic body of the plastering fillet and a supplementary fillet is used so far in practical application. The first possibility mentioned first results in attachment with not always result in satisfactory strength. The second possibility involves great expenditure in its manufacture, since the basic body of the plastering fillet and the supplementary fillet must be adapted for the clamping function.

BRIEF SUMMARY OF THE INVENTION

It is the object of the invention to make available a plastering fillet of the type indicated at the outset which distinguishes itself by a safe, firm attachment of the reinforcing material and involves little expenditure in manufacture.

To meet this object, the plastering fillet according to the invention is characterized in that the reinforcing material is connected to the plastering fillet by means of at least one plastics strand, with the reinforcing material having been interposed between the plastering fillet and the plastics strand when the connection is made, and with a material-uniting connection being established between the plastering fillet and plastics strand. For establishing the material-uniting connection between plastering fillet and the plastics strand, the "net openings" of the reinforcing material are utilized. At these locations, the material of the plastering fillet and the material of the plastics strand can be bonded together in a material-uniting manner. There is no interference from the reinforcing material because it consists of a different material than the plastering fillet and the plastics strand (which is very often the case).

The preferred types of the material-uniting connection are connections made in the softened plastics state, in particular welding connections or connections produced by pressing together materials in an at least surface-softened state, and adhesive connections, in particular adhesive connections with the aid of a hot melt-type adhesive. Additionally, a special case is the coextrusion of the plastering fillet and the plastics strand. The reinforcing material is continuously introduced between the plastering fillet and the plastics strand which are still soft from the extrusion operation, and the components mentioned are united by pressing them together.

Very highly preferred is the formation of the connection as an ultrasonic welding connection. Ultrasonic welding is a type of connection in which the heating required in the welding region for connecting the two components is generated by the effect of ultrasonic oscillations. The development work that led to the invention has shown that, due to the presence of at least one plastics strand, an ultrasonic welding connection with high bonding strength is produced that can be made within a short period of time.

On the other hand, it is expressly disclosed herein that the plastering fillet according to the invention can be restricted to attachment of the reinforcing material to the plastering fillet designed in accordance with the characterizing part of claim 1, however excluding an ultrasonic welding connection.

The connection preferably comprises at least one additional plastics strand on the side of the plastering fillet opposite the reinforcing material. This measure is particularly advantageous when the plastering fillet has perforations in the bonding region, so that the additional plastics strand provides an increase in stability of the connection. When no additional plastics strand is present, it may be advantageous to arrange the connection in a portion (portions) where the plastering fillet has no perforations.

The connection, in particular the welding or ultrasonic welding operation, can be made easiest when the plastering fillet and the plastics strand and, respectively, the additional plastics strand are made of the same plastics material or at least of plastics materials that are similar with respect to their melting temperature. The plastering fillet and the plastics strand and, respectively, the additional plastics strand consist preferably of thermoplastic plastics materials. The reinforcing material preferably is a glass-silk or glass-filament fabric, as is known. However, other reinforcing materials, e.g. of other fibers than glass fibers or plastics threads, are possible as well. According to the invention, a plastering fillet of thermoplastic plastics material can be securely connected to the glass-filament fabric as reinforcing material that is extremely different therefrom in terms of material.

In most cases the reinforcing material attached to the plastering fillet extends substantially along the entire length of the plastering fillet and has a width—as measured transversely of this longitudinal direction—of 10 to 40 cm. This width is dimensioned such that a large-area, net reinforcing material for the plaster layer can be disposed in overlapping manner adjacent the reinforcing material attached to the plastering fillet.

The most preferred materials are glass-filament fabric for the reinforcing material and polyvinyl chloride for the plastering fillet and the at least one plastics strand and, respectively, the at least one additional plastics strand. However, other material combinations can be used as well without a problem when the aspects outlined hereinbefore are taken into consideration.

It is preferably possible to use one or more plastics strands and, respectively, additional plastics strands having the configuration of a round cord. As an alternative thereto, plastics strands of different cross-section, e.g. flat strip cross-section, can be utilized. Moreover, it is possible to make use of a composite arrangement of a plurality of plastics strands, e.g. two or more strands, that are interconnected by a flat web.

A sufficiently stable attachment of the reinforcing material to the plastering fillet can be achieved by means of one plastics strand and, respectively, one additional plastics strand. By means of two plastics strands or, respectively, two additional plastics strands, preferably beside each other with a certain spacing, an optimum between manufacturing expenditure and secure attachment is obtained in many cases. When the plastering fillet—as seen in cross-section—has two legs, preferably two plastics strands or two additional plastics strands, respectively, are provided per leg.

Preferably at least one of the plastics strands and/or at least one of the additional plastics strands is of such a height that it can be used as smoothing edge upon application of a filler layer. The plastics strand or the additional plastics strand, respectively, thus has a smoothing edge function in addition to its role in establishing the welding connection; as a result thereof, the provision of a smoothing edge integral with the basic plastering fillet can be dispensed with in may cases. Preferred heights are 0.5 to 5 mm, most preferably 1 to 3 mm.

The provision of a smoothing edge is also particularly advantageous since the net reinforcing material, in particular glass-filament fabric, usually is provided with a coating or impregnation making it alkali-resistant. When, without the provision of a smoothing edge, uncareful scratching takes place on the reinforcing material with the application tool for applying the filler, this coating or impregnation suffers damage, and the reinforcing material then is no longer perfectly alkali-resistant and may be attacked by the filler material or the plaster layer.

The plastering fillet according to the invention can be used in many fields "in the building trade", where reinforcing material attached to the plastering fillet is useful for embedding in or underneath a plaster layer. Firstly, the first, particularly preferred design is a corner angle fillet in which reinforcing material attached to the plastering fillet extends from one leg or from both legs. Secondly, another preferred design is the design as a plastering fillet for the transition between the plaster layer and a window frame, door frame or the like (e.g. stone, roof framework beams etc.). An exemplary plastering fillet, however without attachment of the reinforcing material to the plastering fillet as in the invention, is described in DE 37 39 912 A1. As a third particularly preferred design, the design as a drip nose fillet for the lower edge of a plaster layer extending in up-down direction is to be mentioned. These designs, however without the attachment of the reinforcing material to the plastering fillet as in case of the invention, as well as other plastering fillet designs are described in WO 97/04197. The overall contents of this reference, especially as regards the design possibilities of the plastering fillets for a large variety of different fields of use and with respect to possible design details of the plastering fillets, are herewith expressly incorporated in the disclosure contents of the present application.

When the plastering fillet has only one leg having the reinforcing material attached thereto and extending away therefrom, the reinforcing material can be attached either on the inside of the leg (i.e. the side facing the building structure to be plastered) or on the outside of the leg (i.e. the side facing in the same direction as the visible face of the plaster layer to be applied). The same holds true for angular fillets having two legs. In the latter case, either of the two. reinforcing material sections can be utilized, one thereof being attached to one leg and the other one thereof being attached to the other leg. As an alternative, it is possible to make use of a continuous reinforcing material section that extends either across the outside of the angle apex of the angular fillet or extends around the inside of the angle apex of the angular fillet. Furthermore, the possibility is mentioned to provide a plastering fillet with a protruding portion extending along the plastering fillet, which may be used as a smoothing edge for a filler layer in which the reinforcing material is embedded, or for a lower plaster layer or—in case of a correspondingly high design—for a plaster layer as a whole.

According to a second aspect, an additional subject matter of the invention consists in a method of attaching a net reinforcing material of plastics to a plastering fillet of plastics material, with the reinforcing material being applied onto the plastering fillet and with at least one plastics strand being applied on top thereof, and with the plastering fillet, the reinforcing material and the at least one plastics strand being then bonded together in particular by welding or ultrasonic welding. All details described in the present application primarily in connection with the finished product (plastering fillet with reinforcing material attached thereto) also constitute preferred developments of the manufacturing method according to the invention.

The invention and preferred developments of the invention will be described in more detail hereinafter by way of embodiments shown in the drawings in which

DETAILED DESCRIPTION OF THE DRAWINGS

Figure 1:
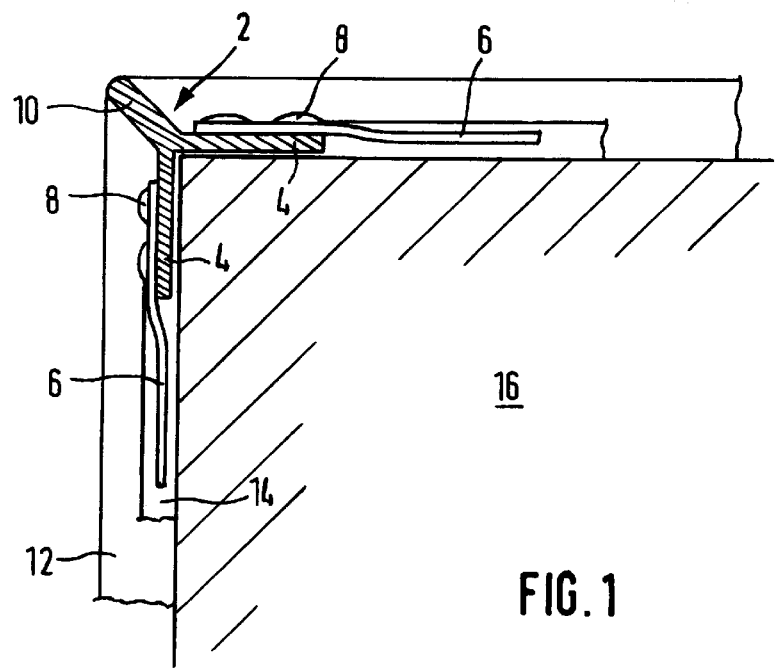
FIG. 1 shows a horizontal cross-sectional view of a plastering fillet having two attached reinforcing material sections and being applied to a thermal insulation of a building.

The plastering fillet 2 shown in FIG. 1 has the configuration of a corner angle fillet. A reinforcing material section 6 is attached on the outside of each leg 4 of plastering fillet 2. Each reinforcing material section 6 consists of glass-filament fabric shown in FIG. 1 as a flat layer for reasons of simplicity.

Attachment of each reinforcing material section 6 to the respective leg 4 of plastering fillet 2 is established by an ultrasonic welding connection that has been carried out with two plastics strands 8 extending in spaced parallel manner in the longitudinal direction of plastering fillet 2. Each plastics strand 8 has deformed in the process of ultrasonic welding and partly has penetrated through the net openings of the reinforcing material 6 and has become united there with the material of the respective leg 4 of plastering fillet 2 by fusing together with the latter.

Plastering fillet 2 has a protruding portion 10 protruding outwardly at the angle apex at an angle of about 45°, and the free end thereof can be used as a smoothing edge for a plaster layer 12.

The plastering fillet 2 has the insides of its legs 4 applied to an outer corner of a thermal insulation, e.g. of foamed polystyrene, and attached there by means of filler 14. The reinforcing material sections 6, at the locations where these extend away from the legs 4, also are attached to the thermal insulation 16 by means of the filler 14.

The reinforcing material 6 is virtually completely embedded in the filler 14 so that it is embedded rather underneath the plaster layer 12 than actually in the plaster layer 12. However, an alternative possibility consists in using only a plaster layer 12 and in dispensing with the filler 14, so that the reinforcing material 6, strictly speaking, is embedded in the plaster layer 12.

Figure 2:
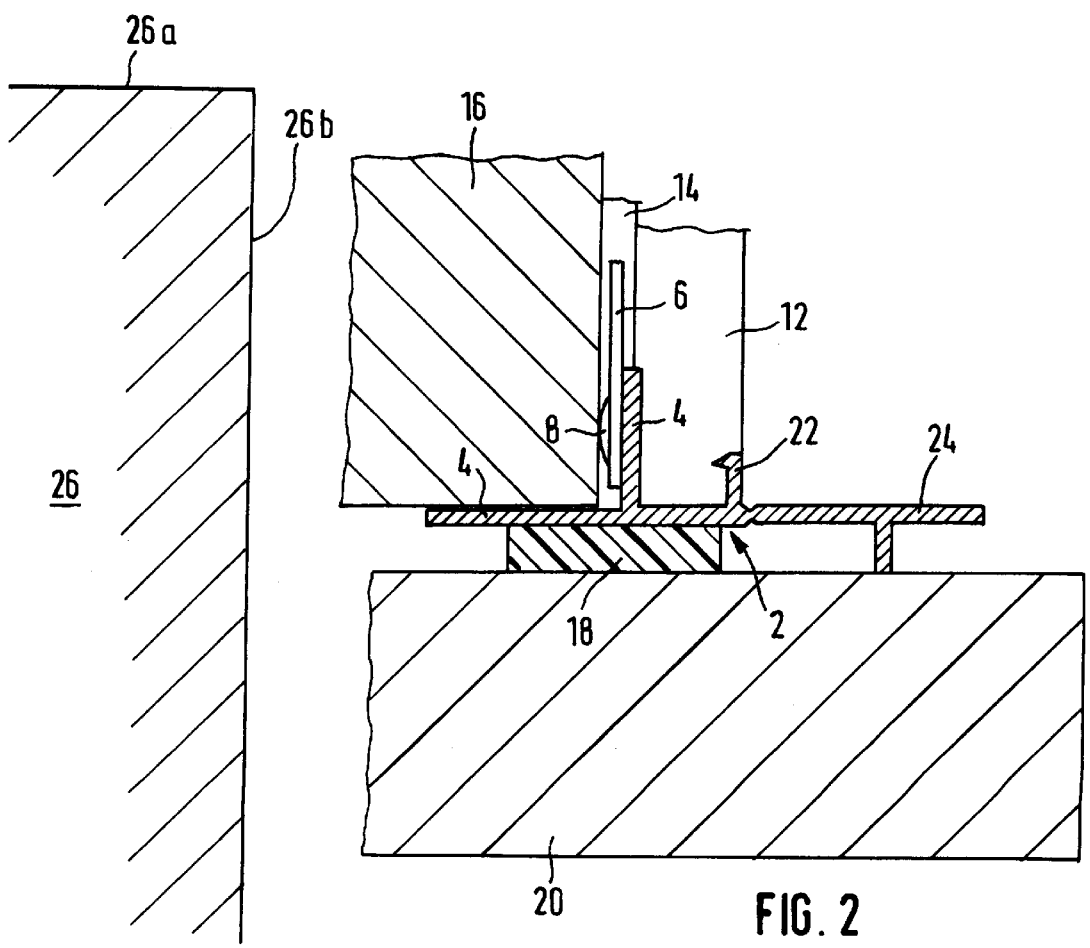
FIG. 2 shows a horizontal cross-sectional view of a plastering fillet having reinforcing material attached thereto and being applied to a window frame.

The plastering fillet 2 shown in FIG. 2 is designed as a transition plastering fillet. Plastering fillet 2 is attached to a window frame with the aid of an adhesive tape 18 of foam material. Perpendicularly to the leg 4 of plastering fillet 2, at which the adhesive tape 18 is disposed, there is provided a leg 4 having attached to its inside (i.e. facing the building wall and the thermal insulation on the building wall, respectively) a reinforcing material 6 by ultrasonic welding. In case of this example only one plastics strand 8 has been used in the ultrasonic welding operation.

Externally (i.e. facing away from the building wall or the thermal insulation on the building wall, respectively,) of the leg 4 having the reinforcing material 6 attached thereto, the plastering fillet 2 has an angular plaster receiving space 20 which in the embodiment shown is supplemented by a leg 22 of lesser height and extending parallel to the latter leg 4 so as to form in part a U-shape that is undercut on one side. In addition thereto, one recognizes a protective flap 24 extending substantially parallel to the window frame 20 and serving for attachment of a protective film for the window surface.

Reference numeral 16 designates a thermal insulation e.g. of foamed polystyrene. In addition thereto, a building wall 26 is outlined, with an edge thereof being disposed between the outside 26a facing away from the building and the intrados side 26b facing towards the window frame.

Figure 3:
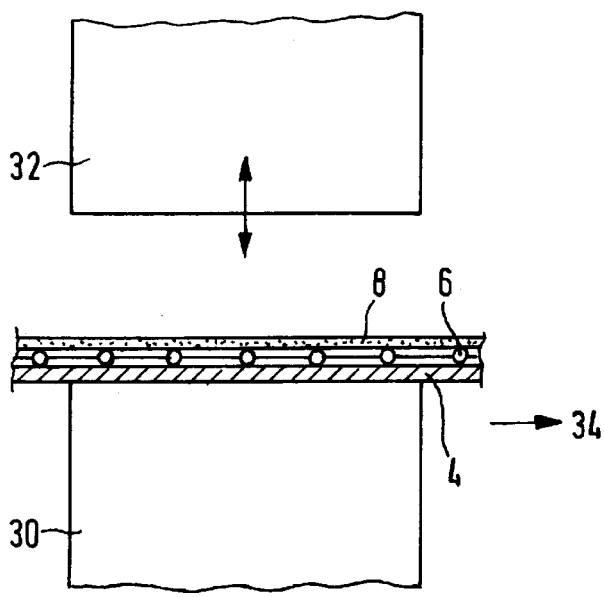
FIG. 3 shows a longitudinal sectional view of a plastering fillet having reinforcing material placed thereon and a plastics strand placed on the latter, prior to ultrasonic welding.

FIG. 3 shows the manner in which the ultrasonic welding connection according to the invention can be produced in practical application. The illustration shown is e.g. a longitudinal sectional view of one of the legs 4 of the plastering fillet 2 of FIG. 1.

For providing the ultrasonic welding connection, a partial length of the plastering fillet 2 is disposed such that the leg 4 on which the operation is to be performed is placed horizontally on top of a welding backing 30. Placed on top thereof is the edge portion of a partial length of a reinforcing material 6. Placed onto the latter are—in the embodiment shown—two plastics strands 8 (one thereof being visible in FIG. 3 in longitudinal section). Thereafter, a welding sonotrode 32 is lowered with its horizontal bottom side onto the material arrangement described, and ultrasonic wave generation is activated. Under the effect of the ultrasonic waves, the polyvinyl chloride of the respective leg 4 of the plastering fillet 2 melts on its top side and the plastics strand 8 melts on its bottom side, with both thereof taking place mainly in locally restricted manner where particularly much heat is generated by superimposition of components to be welded together, due to interference friction generated by the ultrasonic waves. The materials of the leg 4 and of the plastics strand 8 become united through the net openings of the reinforcing material 6 so that the situation shown schematically in FIG. 4 results.

Upon deactivation of the ultrasonic waves, the welding sonotrode 32 is still held pressed against the product disposed on welding backing 30 for a short period of time, until the welding region has cooled down below the melting temperature. Thereafter, the welding sonotrode 32 is lifted off.

Typically, ultrasonic waves in the range from 20 to 40 kHz and an activation time of the ultrasonic waves in the range of 1 s are employed.

After a partial length of the product (i.e. the plastering fillet with reinforcing material attached thereto) has been produced, the product is advanced in the direction of arrow 34 for little less than a further partial length. The aforedescribed steps of the ultrasonic welding operation are then repeated. It is to be understood that this stepped advancing motion and the individual steps described of the ultrasonic welding operation take place in automated manner. The reinforcing material 6 and the plastics strands 8 are automatically withdrawn from supply rollers during this process.

When a corner angle fillet with attached reinforcing material sections is to be produced, the welding backing 30 and the welding sonotrode 32 can be designed such that ultrasonic welding is carried out on both legs 4 simultaneously.

Figure 4:
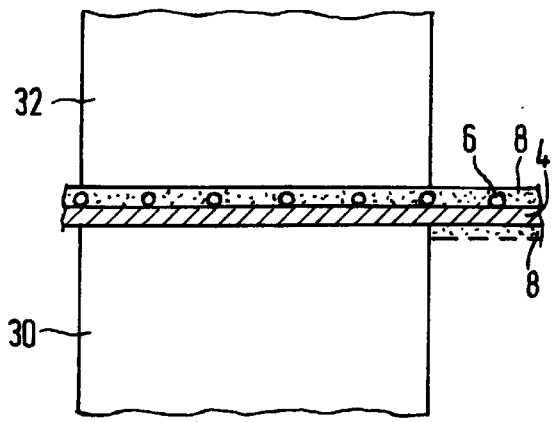
FIG. 4 shows the constituent parts of the embodiment according to FIG. 3, however after ultrasonic welding.

FIG. 4 indicates at the very right side, in broken lines, what the product looks like when at least one additional plastics strand 8 is employed on the bottom side of leg 4.

In the embodiments shown the reinforcing material 6 was a glass-filament fabric and the plastering fillet 2 as well as the plastics strands 8 were made of polyvinyl chloride.

Figure 5:
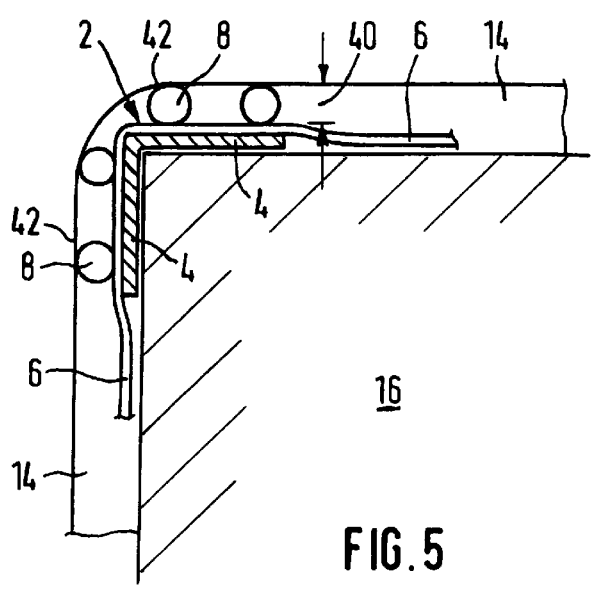
FIG. 5 shows another cross-sectional view of the plastering fillet of FIG. 1, which however is modified in the design of a smoothing edge.

The plastering fillet 2 depicted in FIG. 5 differs from the plastering fillet 2 depicted in FIG. 2 in that it has no protruding portion 10 made from the material of the legs 4. Rather, the four plastics strands 8 are purposefully designed to serve as smoothing edges 42 when the filler layer 14 is applied. The plastics strands 8 are of greater height 40 than in the embodiment according to FIG. 1. Moreover, measures preferably have been taken to make sure that the plastics strands 8 have a height 40 along the legs 4 that remains quite exactly the same, e.g. by having the plastering fillet 2 pass underneath a calibration roller while the plastics strands 8 are still soft. Furthermore, a special feature has been drawn according to which the reinforcing material 6 is passed in integral manner around the outside corner of the plastering fillet 2.

The above description of embodiments was directed throughout to ultrasonic welding connections. However, it is expressly pointed out that other material-uniting connections are possible as well, in particular a welding connection either by means of connecting components that are still soft from before or by means of application of heat, especially by hot air, infrared, laser beams, high frequency radiation, microwaves etc. In practical application, a suitable heat supplying or heat generating means then will have to be conceived of e.g. instead of the welding backing 30 and/or the welding sonotrode 32.

What is claimed is:

1. A plastering fillet arrangement comprising:
a plastering fillet of plastic material
a reinforcing net material at least partially overlaying the plastering fillet; and
at least one plastics strand overlaying the reinforcing net material and having a material-uniting connection with the plastering fillet through the reinforcing net material.

2. The plastering fillet arrangement of claim 1, wherein said material-uniting connection is an ultrasonic welding connection.

3. The plastering fillet arrangement of claim 2, wherein at least one of said plastics strands is of such a height that it serves as a smoothing edge upon application of a filler layer.

4. The plastering fillet arrangement of claim 3, wherein said height is 0.5 to 5 mm.

5. The plastering fillet arrangement of claim 3, wherein said height is 1 to 3 mm.

6. The plastering fillet arrangement of claim 1, wherein said material-uniting connection is a connection made in a softened plastic state during the manufacture of the fillet.

7. The plastering fillet arrangement of claim 6, wherein at least one of said plastics strands is of such a height that it serves as a smoothing edge upon application of a filler layer.

8. The plastering fillet arrangement of claim 7, wherein said height is 1 to 3 mm.

9. The plastering fillet arrangement of claim 1,
wherein said connection has at least one additional plastics strand on a side of the plastering fillet opposite the reinforcing material.

10. The plastering fillet arrangement of claim 9, wherein at least one of the at least one plastics strand and the at least one additional plastics strand has the configuration of a round cord.

11. The plastering fillet arrangement of claim 9,
wherein at least one of the at least one plastic strand and the at lest one additional plastic strand has the configuration of a composite arrangement of a plurality of round cords beside each other.

12. The plastering fillet arrangement of claim 9, wherein said plastering fillet and at least one of the one plastic strands and the at least one additional plastic strand are comprised of polyvinyl chloride.

13. The plastering fillet arrangement of claim 9, wherein at least one of the at least one plastics strands and the at least one additional plastics strands is of such a height that it serves as a smoothing edge upon application of a filler layer.

14. The plastering fillet arrangement of claim 13, wherein said height is 0.5 to 5 mm.

15. The plastering fillet arrangement of claim 13, wherein said height is 1 to 3 mm.

16. The plastering fillet arrangement of claim 1, wherein at least one of two plastics strands and two additional plastic strands are provided beside each other.

17. The plastering fillet arrangement of claim 1,
wherein said reinforcing material is a glass-filament fabric.

18. The plastering fillet arrangement of claim 1, wherein said plastering fillet and said at least one plastic strand is comprised of polyvinyl chloride.

19. The plastering fillet arrangement of claim 1, wherein said plastering fillet is a comer fillet with an attached reinforcing material extending away from an at least one leg.

20. The plastering fillet arrangement of claim 1, wherein the plastering fillet acts as a transition between a plaster layer and an opening.

21. The plastering fillet arrangement of claim 1, wherein the plastering fillet is a drop-nose fillet for the lower edge of a plaster layer extending in a vertical direction.

22. The plastering fillet arrangement of claim 1, wherein at least one of said plastics strands is of such a height that it serves as a smoothing edge upon application of a filler layer.

23. The plastering fillet arrangement of claim 22, wherein said height is 0.5 to 5 mm.

24. The plastering fillet arrangement of claim 22, wherein said height is 1 to 3 mm.

25. The plastering fillet arrangement of claim 1, wherein the plastering fillet acts as a transition between a plaster layer and a window frame.

26. The plastering fillet arrangement of claim 1, wherein the plastering fillet acts as a transition between a plaster layer and a door frame.

27. The plastering fillet arrangement of claim 7, wherein said height is 0.5 to 5 mm.

* * * * *